US012717044B2

(12) United States Patent
Fritz

(10) Patent No.: US 12,717,044 B2
(45) Date of Patent: Aug. 25, 2026

(54) POSITION DETERMINING SYSTEM AND METHOD FOR DETERMINING THE POSITION OF A REFERENCE POINT ON A SELF-PROPELLED CONSTRUCTION MACHINE AS WELL AS METHOD FOR INITIALIZING A REFERENCE STATION SET UP IN THE PERIPHERY OF A SELF-PROPELLED CONSTRUCTION MACHINE

(71) Applicant: Wirtgen GmbH, Windhagen (DE)

(72) Inventor: Matthias Fritz, Hennef (DE)

(73) Assignee: Wirtgen GmbH, Windhagen (DE)

( * ) Notice: Subject to any disclaimer, the term of this patent is extended or adjusted under 35 U.S.C. 154(b) by 336 days.

(21) Appl. No.: 18/470,802

(22) Filed: Sep. 20, 2023

(65) Prior Publication Data

US 2024/0103179 A1 Mar. 28, 2024

(30) Foreign Application Priority Data

Sep. 23, 2022 (DE) ..................... 10 2022 124 484.9

(51) Int. Cl.
*G01S 19/07* (2010.01)
*G05D 1/00* (2006.01)

(52) U.S. Cl.
CPC .......... *G01S 19/071* (2019.08); *G05D 1/0278* (2013.01)

(58) Field of Classification Search
CPC ............................ G01S 19/071; G05D 1/0278
USPC ..................................................... 342/357.44
See application file for complete search history.

(56) References Cited

U.S. PATENT DOCUMENTS

| | | | |
|---|---|---|---|
| 6,140,959 | A | 10/2000 | Gudat et al. |
| 6,229,478 | B1 | 5/2001 | Biacs et al. |
| 6,371,566 | B1 | 4/2002 | Häehn |
| 2007/0085734 | A1 | 4/2007 | Whitehead et al. |

(Continued)

FOREIGN PATENT DOCUMENTS

| | | |
|---|---|---|
| DE | 19756676 C1 | 6/1999 |

OTHER PUBLICATIONS

Trimble. "Trimble® SPSx51 Modular GPS Receivers," Version 3.60 Revision A Jan. 2008 Trimble Navigation Limited (Year: 2008).*

(Continued)

*Primary Examiner* — Samarina Makhdoom
(74) *Attorney, Agent, or Firm* — Gary L. Montle; Lucian Wayne Beavers; Patterson Intellectual Property Law, PC

(57) ABSTRACT

A position determination system and a method are provided for determining the position of a reference point on a self-propelled construction machine in a coordinate system independent of the machine, and a method for initializing a reference station set up in the periphery of a self-propelled construction machine for sending correction signals. The position determination system comprises a DGPS rover unit for receiving satellite signals from a global navigation satellite system and correction signals from a reference station. For initializing the reference station, a position dataset describing the predetermined positions of a reference station is read out from a memory unit, wherein the actual reference station position is determined on the basis of a comparison of the predetermined positions of the reference station with the reference station position determined by the reference station.

14 Claims, 9 Drawing Sheets

(56) References Cited

U.S. PATENT DOCUMENTS

| | | | | |
|---|---|---|---|---|
| 2011/0305260 | A1 | 12/2011 | Mcmanus | |
| 2014/0081532 | A1* | 3/2014 | Fritz | E01C 23/127 701/50 |
| 2018/0031711 | A1* | 2/2018 | Cash | G01S 19/40 |
| 2018/0210092 | A1* | 7/2018 | Shinkai | G01S 19/04 |
| 2021/0318446 | A1* | 10/2021 | Kishimoto | G01S 19/07 |
| 2021/0341629 | A1 | 11/2021 | Kishimoto | |
| 2022/0035041 | A1 | 2/2022 | Hauschild et al. | |

OTHER PUBLICATIONS

European Search Report for corresponding patent application No. 23196396.8, dated Feb. 19, 2024, 22 pages (not prior art).

German Office Action for corresponding patent application No. 10 2022 124 484.9, dated Dec. 5, 2023, 12 pages (not prior art).

* cited by examiner

PD
P1 4 5 1
P2 8 8 0
P3 12 6 2
P4 15 7 2
P1
P2
P3
P4
16
X1' Y1' Z1'
3 5 0
15
17
I
R
X
Y
Z

| | | | |
|---|---|---|---|
| P1 | 4 | 5 | 1 |
| P2 | 8 | 8 | 0 |
| P3 | 12 | 6 | 2 |
| P4 | 15 | 7 | 2 |

| X2' | Y2' | Z2' |
|---|---|---|
| 8 | 8 | -1 |

POSITION DETERMINING SYSTEM AND METHOD FOR DETERMINING THE POSITION OF A REFERENCE POINT ON A SELF-PROPELLED CONSTRUCTION MACHINE AS WELL AS METHOD FOR INITIALIZING A REFERENCE STATION SET UP IN THE PERIPHERY OF A SELF-PROPELLED CONSTRUCTION MACHINE

CROSS-REFERENCES TO RELATED APPLICATIONS

This application claims the benefit of German Patent Application No. DE 10 2022 124 484.9, filed Sep. 23, 2022, and which is hereby incorporated by reference.

FIELD OF THE INVENTION

The invention relates to a position determination system for determining the position of a reference point on a self-propelled construction machine in a coordinate system independent of the construction machine. Furthermore, the invention relates to a method for initializing a reference station set up in the periphery of a self-propelled construction machine for transmitting correction signals, which are calculated on the basis of a predetermined reference station position and the reference station position determined by the reference station, to a DGPS rover unit, which determines position data describing the position of a reference point on the construction machine in a coordinate system independent of the construction machine on the basis of the satellite signals of a global navigation satellite system and the correction signals. Furthermore, the invention relates to a method for determining the position of a reference point on a self-propelled construction machine in a coordinate system independent of the construction machine.

BACKGROUND

Self-propelled construction machines are understood to be all construction machines that have a working apparatus mounted on a machine frame for erecting structures on a site or for altering the site. Known self-propelled construction machines include, for example, road milling machines, stabilizers, recyclers, slipform pavers or road pavers. In road milling machines or recyclers, the working apparatus comprises a milling/cutting drum equipped with milling or cutting tools, which can be used to remove material from the terrain in a predetermined working width. The working apparatus of slipform pavers is a device for shaping flowable material, particularly concrete, which can be used to produce building structures of various designs, for example crash barriers or traffic islands. The well-known pavers have a paving screed for placing the material for the road surface. Soil compactors such as road rollers have at least one compaction device, particularly compactor rollers for compacting the subsoil.

For the erection of structures on the site or for altering the terrain, the aim with self-propelled construction machines is to achieve largely automatic control of the construction machine without significant intervention by the driver. Therefore, known self-propelled construction machines use positioning systems that determine the position of a reference point on the self-propelled construction machine in a coordinate system independent of the construction machine.

GPS (Global Positioning System) is a positioning system based on the evaluation of the signal propagation times of signals from several satellites. The abbreviation GPS is now used colloquially, and in some cases even technically, as a generic term or pars pro toto for all satellite navigation systems that are correctly grouped under the abbreviation GNSS (Global Navigation(al) Satellite System) (Wikipedia: GPS). In the following, GPS shall be understood to mean all satellite navigation systems.

A method known as DGPS (Differential Global Positioning System) increases the accuracy of GPS positioning by transmitting correction signals (orbit and time system). DGPS also uses stationary reference stations known as base stations, which can be used to very accurately determine the actual travel times of the signals for each satellite from the deviation of the actual and received positions. The differences between the theoretical and the actual signal propagation times are transmitted to the DGPS receivers, which correct their position with these correction signals (Wikipedia: DGPS). In the following, (D)GPS receivers are understood to be all receivers for any GNSS and, if applicable, for correction signals to this system.

A road milling machine is known from DE 197 56 676 C1, which has a DGPS for position determination. The construction machine has a DGPS rover unit for receiving satellite signals from a global navigation satellite system and correction signals from a reference station, wherein the DGPS rover unit is configured to determine position data describing the position of a reference point on the construction machine in a coordinate system independent of the construction machine based on the satellite signals and the correction signals. To increase the accuracy of the position determination, a reference station is set up in the vicinity of the construction machine, which sends correction signals to the DGPS rover unit. When the construction machine moves off-road, the reference station must be converted, as the accuracy of the position determination decreases with increasing distance between the DGPS rover unit and the reference station.

The DGPS requires that the exact position of the reference station is known. The position of the reference station can be determined using classical surveying methods. In practice, however, the reference station is set up at specific points in the terrain that have been determined beforehand during site planning and whose position data are known. This predetermined position data is manually entered into the reference station by means of an input unit when configuring the construction site. A new data entry is always required when the reference station is converted. In practice, this procedure is not only time-consuming, but also prone to errors, as the correct position data must be entered at the respective set-up point. The determination of the exact coordinates of the reference station set up in the terrain and the transfer of these coordinates to a memory unit of the reference station is hereinafter referred to as initialization of the reference station.

BRIEF SUMMARY

An object of a position determination system as disclosed herein may be, in practice, to facilitate the configuration of the construction site and reduce the risk of incorrect data entry. A further object may be to provide a method for initializing a reference station set up in the vicinity of a self-propelled construction machine and a method for determining the position of a reference point on a construction machine in a coordinate system independent of the construction machine, which method permits simple and safe initialization of the reference station.

Embodiments of an invention as described below can comprise one or more of the features or feature combinations mentioned below. A feature denoted by an indefinite article can also be present multiple times if the indefinite article is not to be understood with an explicit indication of only one-time use. A denotation of features by a numeral, e.g., “first and second,” does not preclude that these features can be present more times than the number indicated by the numeral.

A position determination system as disclosed herein for determining the position of a reference point on a self-propelled construction machine in a coordinate system independent of the construction machine comprises a DGPS rover unit for receiving satellite signals from a global navigation satellite system and correction signals from a reference station, wherein the DGPS rover unit is configured such that position data describing the position of a reference point on the construction machine is determined in a coordinate system independent of the construction machine on the basis of the satellite signals and the correction signals. A rover unit is understood to be a mobile unit that can determine a position of the self-propelled construction machine when the rover unit is associated with the construction machine. The rover unit may comprise several components, for example a GPS antenna and a computing and evaluation unit, wherein the GPS antenna is arranged at the reference point so that the GPS antenna can receive the satellite signals. With the known position of the reference point on the construction machine in the coordinate system independent of the construction machine, the position of the working tool, for example, can then be determined in the coordinate system independent of the construction machine on the basis of a known position of the working apparatus of the construction machine relative to the reference point.

The DGPS rover unit determines the exact position using a reference station to be set up around the construction machine to send correction signals (correction data) to the DGPS rover unit. To generate the correction signals, the exact position of the reference station must be known. The reference station is configured in such a manner that it can determine its own position. However, this positioning is inaccurate because this positioning is not based on the DGPS method. Therefore, the actual reference station position must be communicated to the reference station by initialization. The reference station is configured such that the correction signals are then calculated based on the actual reference station position and the reference station position determined (received) by the reference station.

If several construction machines are used on a construction site, reference stations assigned to the individual construction machines can be provided, each of which sends correction signals to the respective construction machine. However, it is also possible that only one reference station is provided whose correction signals are received by several construction machines. In principle, several base stations can also be provided, which are configured at different predefined reference station positions and thus cover a larger area of the construction site.

The operating principle of the position determination system or method according to the invention is based on the fact that the reference station is set up at specific locations whose layer is known. These locations can be determined when planning the construction site in the office. For example, the locations can be suitable markings in the terrain around the working area of the construction machine, where the reference stations are set up when the machine moves along a predetermined path, for example along the roadway to be worked.

The position determination system according to the invention is characterized in that, for initializing the reference station, a position dataset describing the predetermined positions of a reference station is read out from a memory unit, wherein the actual reference station position is determined on the basis of a comparison of the predetermined positions of the reference station with the reference station position determined by the reference station.

The specified positions of a reference station are understood to be the locations in the terrain whose positions are known and where the reference stations are to be placed along the path to be processed. These positions are stored in the memory unit and are read out from the memory unit. In this context, a memory unit is understood to be all data memories on which data can be stored and from which the data can be read, for example the known electronic memories (semiconductor memories) and storage media which can be read or written with electronic apparatus.

The comparison allows an automated assignment of the relevant coordinate values so that the coordinate values of the actual position of the reference station can be selected from the position dataset without the need for additional input at the construction site. This simplifies initialization and eliminates incorrect entries.

In this context, a comparison is understood to be a correlation of the individual positions in order to be able to determine deviations of the known, exact positions from the measured, inaccurate positions so that the values can be correctly assigned to each other. The comparison can be based on known arithmetic operations or algorithms.

One embodiment of the position determination system according to the invention provides that the position determination system is configured such that deviations of the coordinate values of the predetermined positions of the reference station from the reference station position determined by the reference station are determined, wherein the actual reference station position is assumed to be the predetermined position of the reference station whose coordinate values deviate from the coordinate values of the reference station position determined by the reference station by a smallest value or deviate by smallest values. This evaluation can be based on different coordinate systems or coordinates, wherein individual or several coordinate values of a position can be compared. Mean values can also be formed from several coordinate values, which are set in relation to one another.

An alternative embodiment of the position determination system according to the invention provides that the position determination system is configured in such a way that deviations of the coordinate values of the predetermined positions of the reference station from the reference station position determined by the reference station are determined, wherein the actual position of the reference station is assumed to be the predetermined position of the reference station whose coordinate values deviate from the coordinate values of the reference station position determined by the reference station by a value that is smaller than or equal to a predetermined limit value, or deviate by values that are smaller than or equal to predetermined limit values. If the deviations of all measured reference station positions are too large that they do not meet these criteria, an acoustic and/or visual alarm can be given to the operating personnel, prompting them to check or enter the data manually.

The components of the position determination system according to the invention required for initializing the reference station may be part of the DGPS rover unit and/or the reference station and/or an external unit, wherein the DGPS rover unit may be part of the self-propelled construction machine whose position is to be determined. The data exchange required between the individual components can take place by means of the known data-transfer apparatuses, for example via WLAN, Bluetooth or the Internet. For the data transmission for the initialization of the reference station, the same data connection can be used in particular preference, via which the DGPS rover unit receives the correction signal from the reference station.

The reference station can transmit the position data describing the reference station position determined by the reference station to the DGPS rover unit, and the DGPS rover unit can receive this position data from the reference station. The DGPS rover unit can then read out the position dataset describing the predetermined positions of a reference station from the memory unit and determine the actual reference station position based on a comparison of the predetermined positions of the reference station with the reference station position determined by the reference station, and send position data describing the actual reference station position to the reference station, and the reference station can receive this position data. The actual evaluation of the data thus takes place in the DGPS rover unit, which is located on the self-propelled construction machine. The data can also be analyzed with a data processing device connected to the DGPS rover unit. The data transmission from the reference station to the DGPS rover unit can be carried out via the data transmission links already existing with the known apparatuses and/or additional data transmission links. However, this embodiment requires bidirectional data transmission between the reference station and the DGPS rover unit in order to transmit the position values determined by the DGPS rover unit to the reference station. Bidirectional is to be understood functionally and can also be realized, for example, by two unidirectional connections.

If multiple construction machines are provided on site, a GPS rover unit can be provided to assist the reference station in determining its actual position and all other DGPS units present can use the corrected signal.

An alternative embodiment provides that the reference station and the DGPS rover unit are configured such that the DGPS rover unit or the data processing device connected to the DGPS rover unit reads out the position dataset describing the predetermined positions of a reference station from the memory unit and transmits it to the reference station, and the reference station receives the position dataset describing the predetermined positions of a reference station, wherein the reference station then determines the actual reference station position based on a comparison of the predetermined positions of the reference station with the reference station position determined by the reference station. The actual evaluation of the data thus takes place in the reference station in this embodiment. This embodiment also requires bidirectional data transmission between the reference station and the DGPS rover unit.

The memory unit can be an internal memory unit of the DGPS rover unit. For example, an electronic memory (semiconductor memory) can be provided in the DGPS rover unit into which the position data can be read. However, the memory unit may also be an external memory unit, wherein the DGPS rover unit communicates with the external memory unit for data exchange. This does not preclude the DGPS rover unit from also having a memory to store the data read from the external memory for the computing operations.

The position determination system may comprise a server unit having the memory unit for storing a position dataset describing the predetermined positions of the reference station. In this exemplary embodiment, the reference station and the server unit are configured such that the reference station transmits to the server unit the position data describing the reference station position determined by the reference station and this position data is received by the server unit, and that the server unit determines the actual reference station position based on a comparison of the predetermined positions of the reference station with the reference station position determined by the reference station and transmits position data describing the actual reference station position to the reference station and the reference station receives this position data.

The reference station and the server unit may also be configured such that the server unit transmits the position dataset describing the predetermined positions of a reference station to the reference station and the reference station receives this position dataset, and the reference station determines the actual reference station position based on a comparison of the predetermined positions of the reference station with the reference station position determined by the reference station.

A method as disclosed herein for initializing a reference station set up in the periphery of a self-propelled construction machine for transmitting correction signals, which are calculated on the basis of the actual reference station position and the reference station position determined by the reference station, to a DGPS rover unit, which determines position data describing the position of a reference point on the construction machine in a coordinate system independent of the construction machine on the basis of the satellite signals of a global navigation satellite system and the correction signals, is characterized in that, for initializing the reference station, the actual reference station position is determined on the basis of a comparison of the predetermined positions of the reference station stored in a memory unit with the reference station position determined by the reference station.

A method as disclosed herein for determining the position of a reference point on a construction machine in a manner independent of the construction machine comprises the following method steps:

- providing a DGPS rover unit which determines position data describing the position of a reference point on the construction machine in a coordinate system independent of the construction machine on the basis of satellite signals from a global navigation satellite system and correction signals from a reference station,
- setting up a reference station for transmitting correction signals to the DGPS rover unit, wherein the correction signals are calculated based on the actual reference station position and the reference station position determined by the reference station.

To initialize the reference station, the actual reference station position is determined based on a comparison of the predetermined positions of the reference station stored in a memory unit with the reference station position determined by the reference station.

Basically, the reference station position determined by the reference station is first determined in a spherical coordinate system dependent on the (D)GPS system used and then transformed into a site-related Cartesian coordinate system for further use.

Preferably, the position dataset describing the specified positions is also available in the construction site-related Cartesian coordinate system. The actual reference station position is then determined by comparing the Cartesian coordinates of the determined reference station position and the position dataset.

However, it is also conceivable that the position dataset describing the specified positions is available in the spherical coordinate system used by the reference station. Then the actual reference station position is determined by comparing the spherical coordinates of the determined reference station position and the position dataset.

Subsequently, the actual reference station position determined in spherical coordinates can be transformed into a site-specific Cartesian coordinate system.

BRIEF DESCRIPTION OF THE SEVERAL VIEWS OF THE DRAWINGS

Several exemplary embodiments of the invention are described in detail below with reference to the drawings.

DETAILED DESCRIPTION

Figure 1:
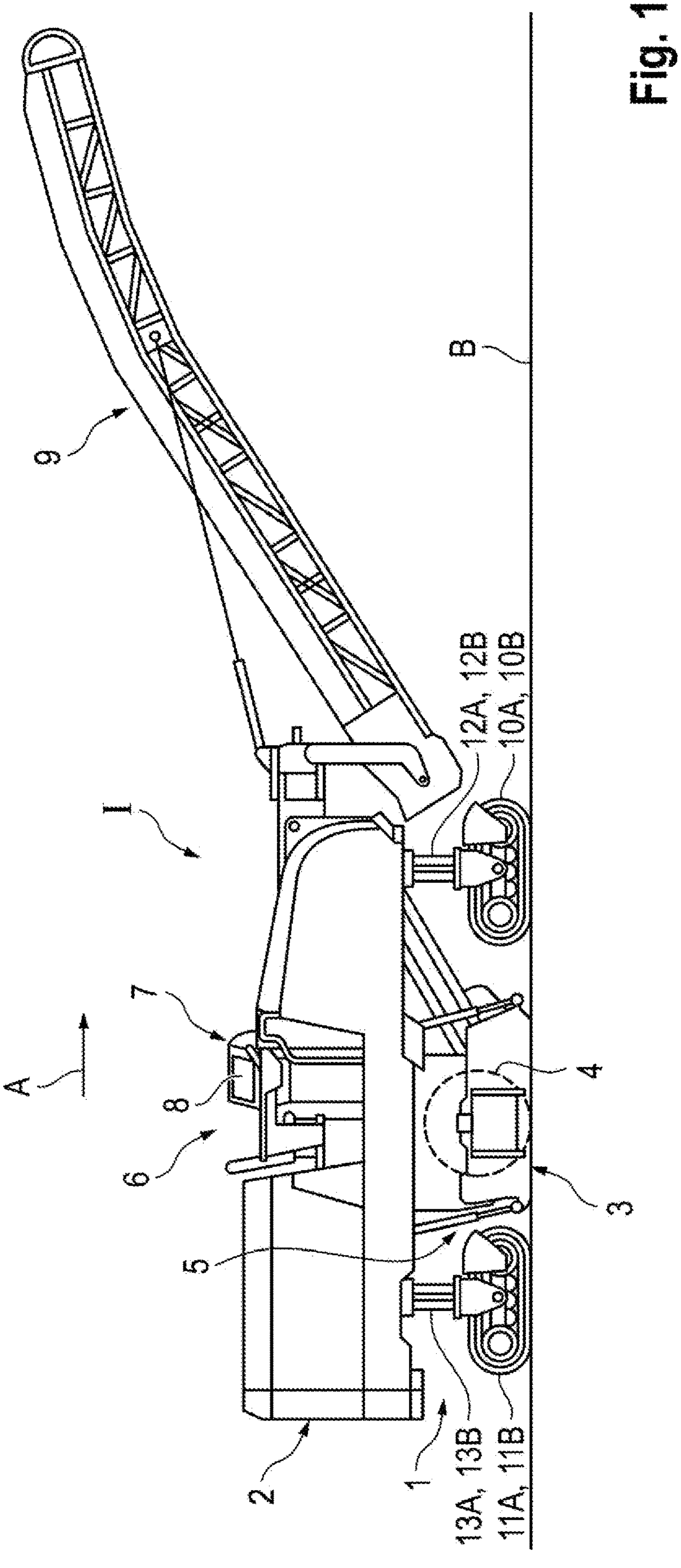
FIG. 1 shows a side view of a self-propelled construction machine.
Figure 2:
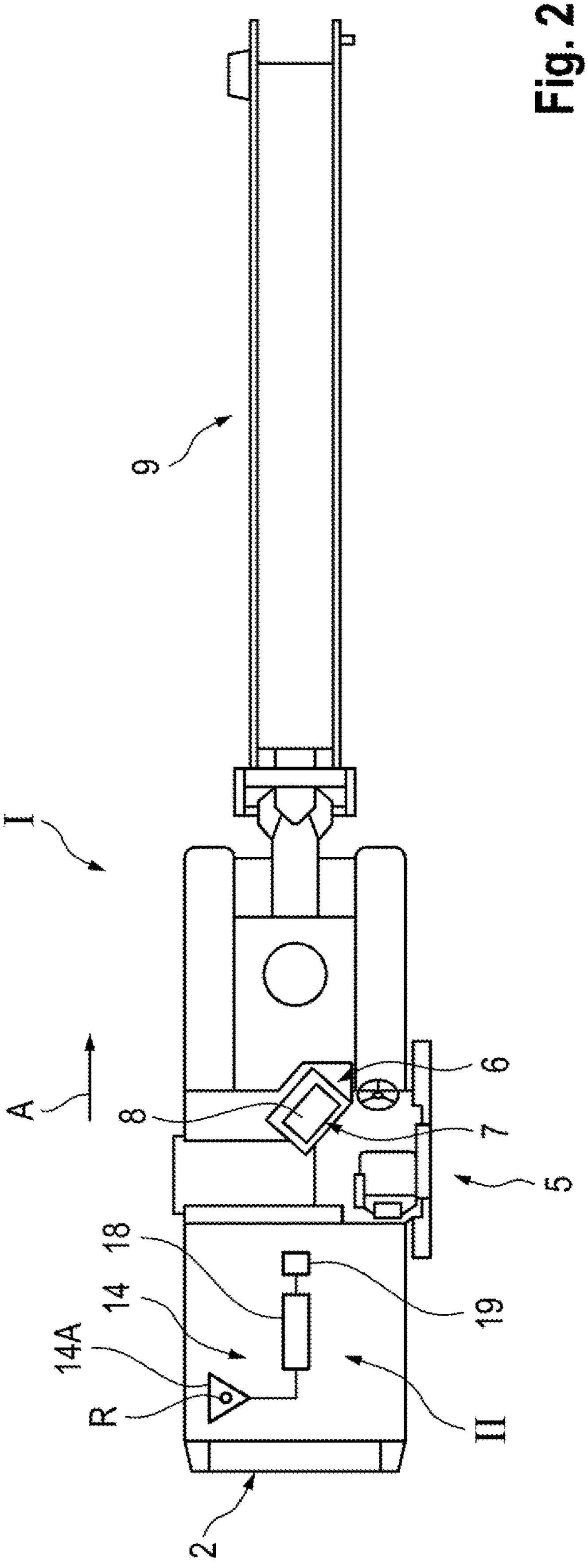
FIG. 2 shows a top view of the self-propelled construction machine of FIG. 1.

FIGS. 1 and 2 show a respective side view and plan view, as an example of a self-propelled construction machine I, a road milling machine for milling road surfaces, which is a front loader road milling machine. The construction machine I has a machine frame 2 supported by a chassis 1, on which a working apparatus 3 is arranged, with which the work required for the construction work can be performed. The working apparatus 3 has a milling drum 4, which is only indicated in FIG. 1 and is arranged in a milling drum housing 5. Above the milling drum housing 5, the operator's platform 6 with a control panel 7 for the machine operator is located on the machine frame. The control panel 7 can have a touch screen 8 on which control panels (buttons) are represented. The milled material is discharged by a conveyor 9, which is swivellably and tiltably arranged at the front of the machine frame 2.

The self-propelled construction machine I can have, in the working direction A, a front left running gear 10A and a front right running gear 10B and a rear left running gear 11A and a rear right running gear 11B, with which are associated, in the working direction A, a front left and right lifting apparatus 12A, 12B and a rear left and right lifting apparatus 13A, 13B, so that, by retracting and extending the lifting apparatuses respectively, the height and inclination of the machine frame 2 relative to the ground surface B can be varied.

To determine the position of a reference point R on the construction machine I, a position determining device II is provided, the design and function of which are described in detail below.

Figure 3:
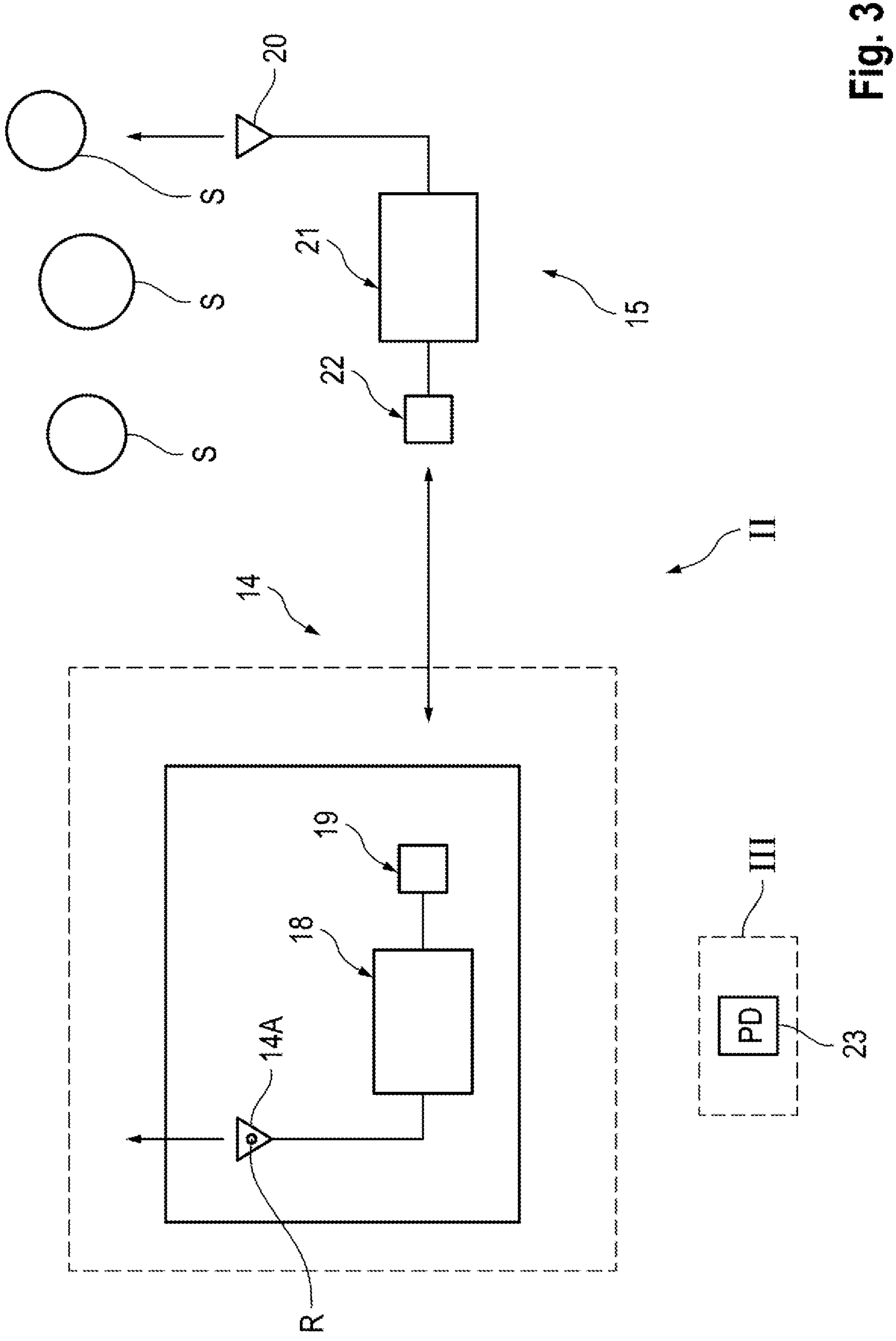
FIG. 3 shows an exemplary embodiment of the position determination system for determining the position of a reference point on the construction machine.
Figure 4:
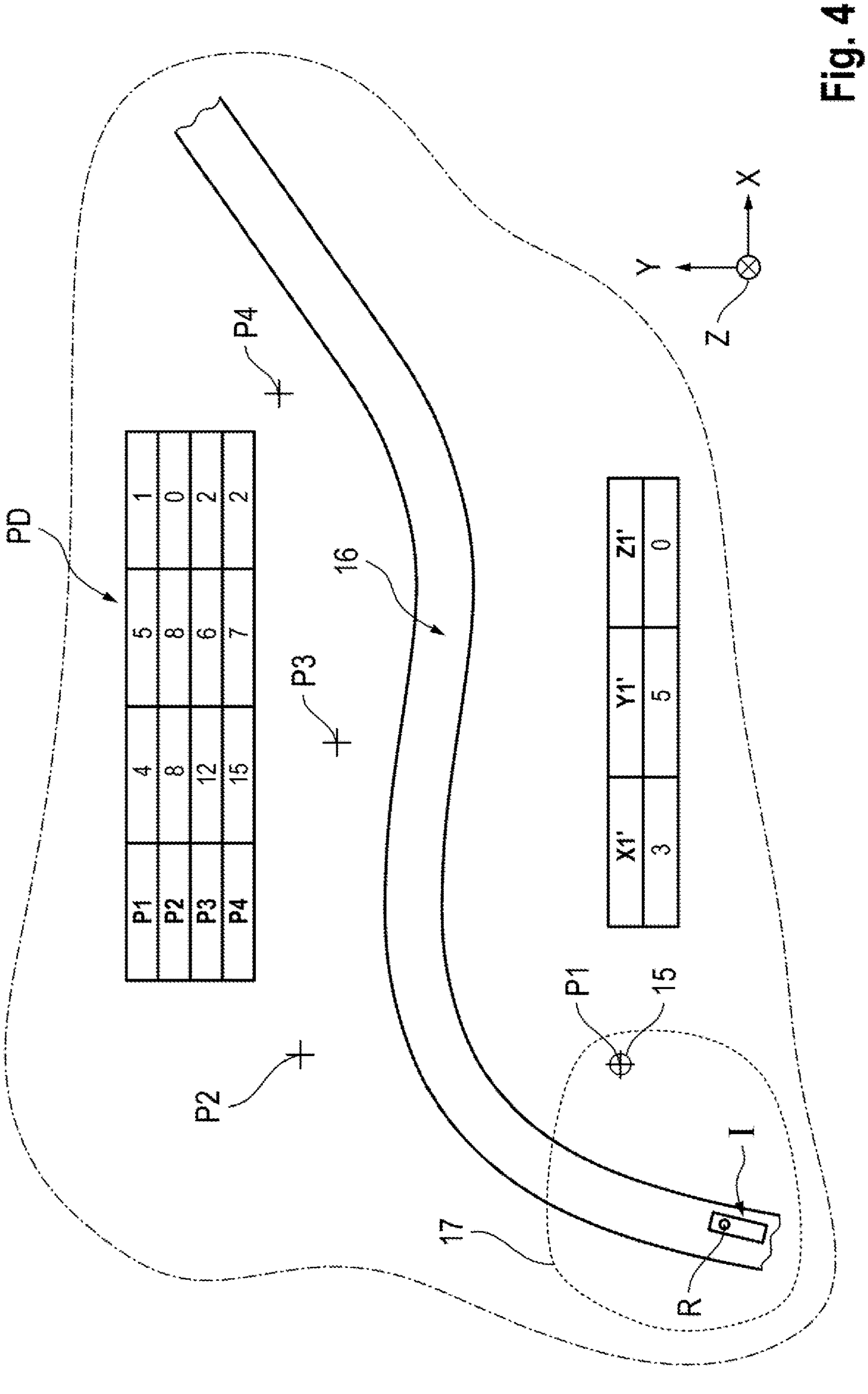
FIG. 4 shows the self-propelled construction machine moving along a path, wherein the reference station is set up at a first position.
Figure 5:
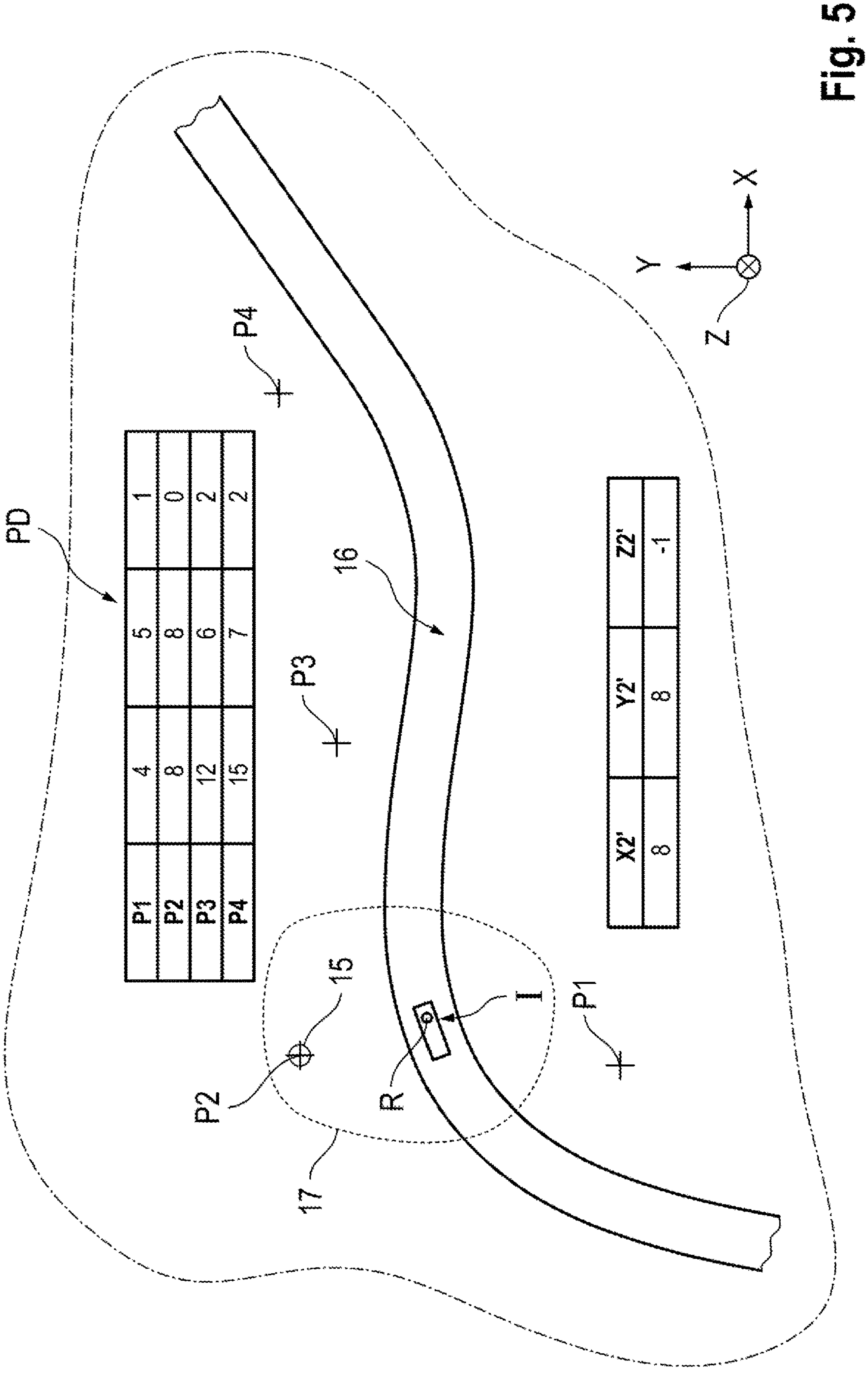
FIG. 5 shows the self-propelled construction machine moving along a path, wherein the reference station is set up at a second position.
Figure 6:
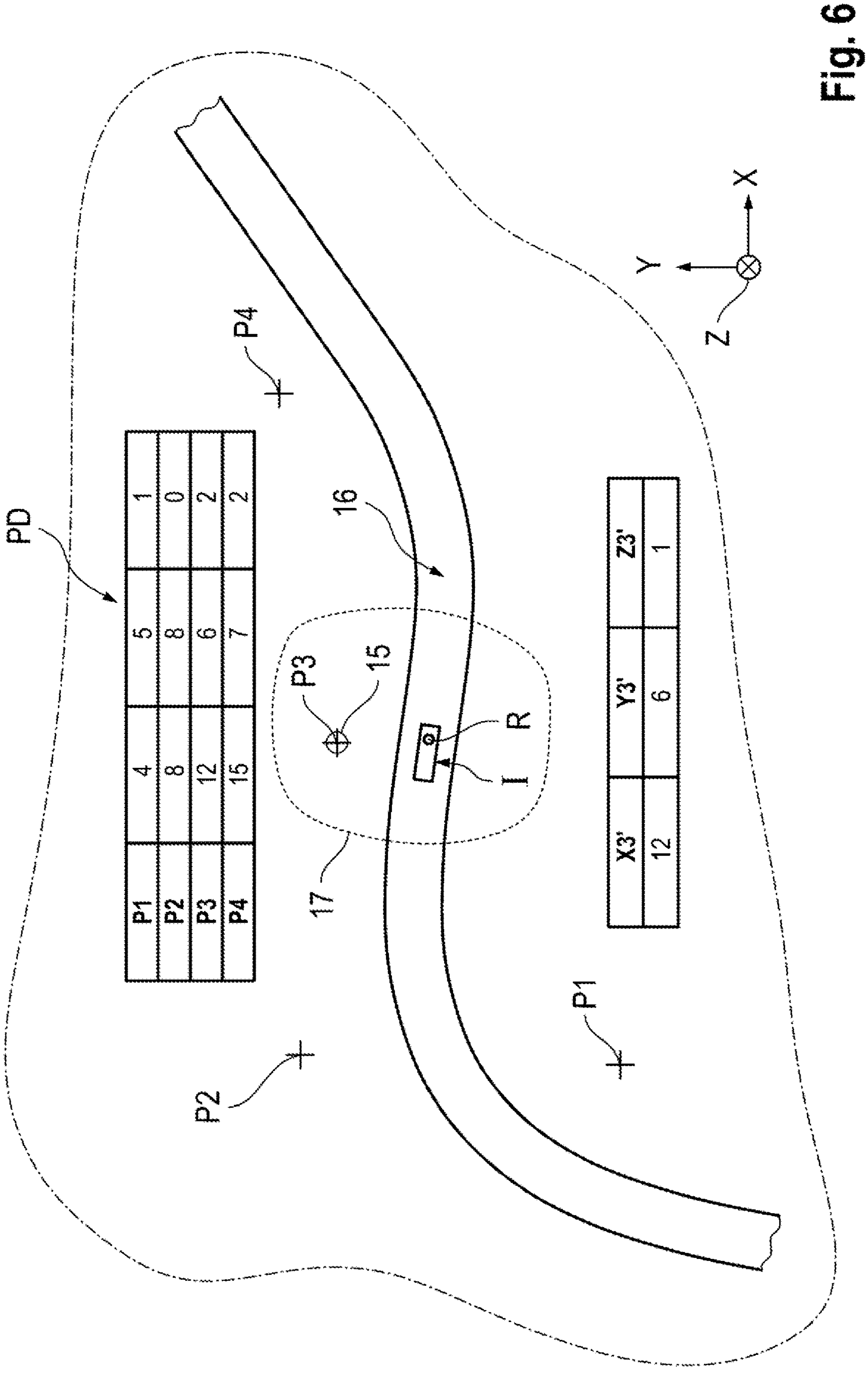
FIG. 6 shows the self-propelled construction machine moving along a path, wherein the reference station is set up at a third position.
Figure 7:
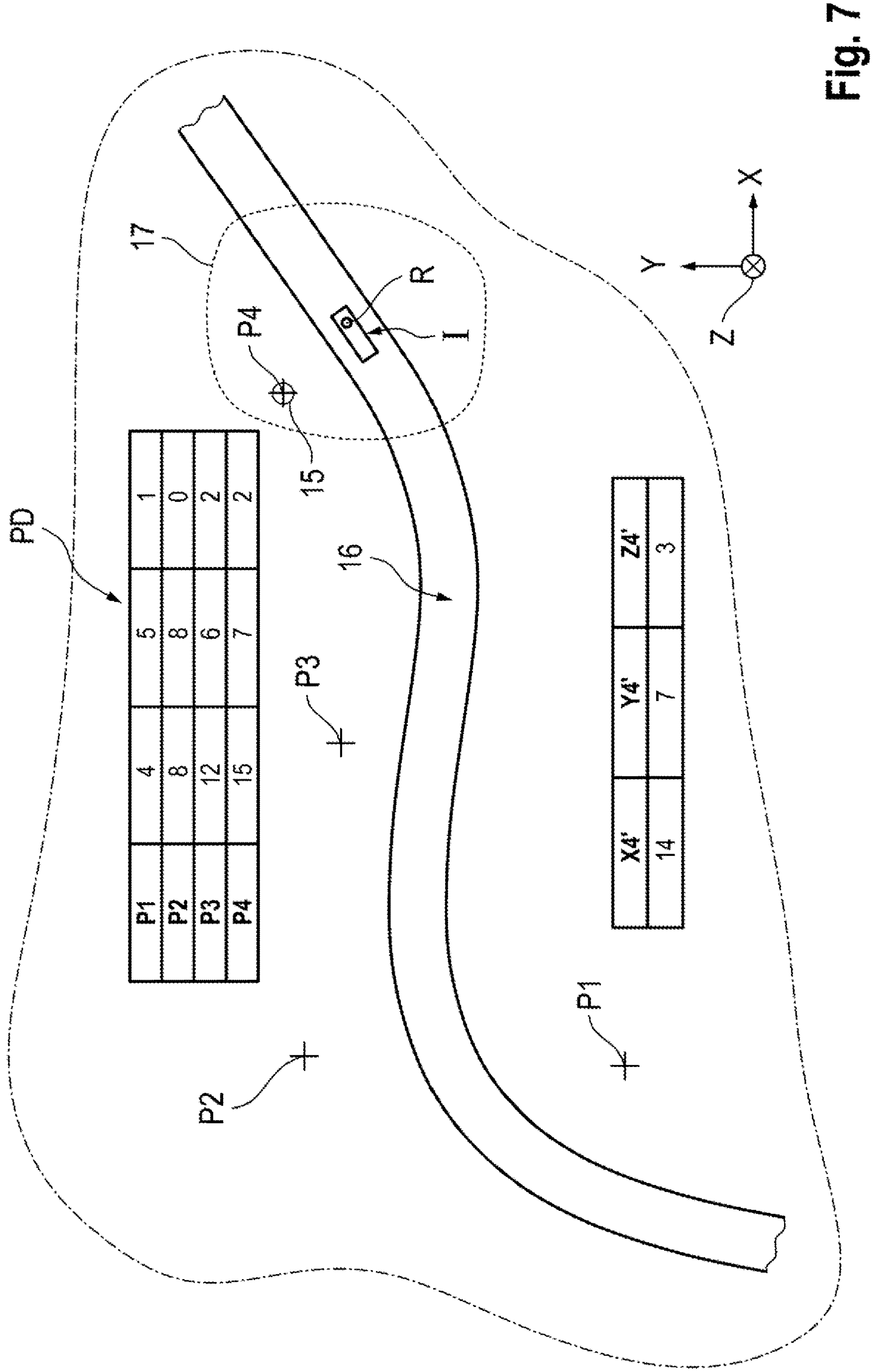
FIG. 7 shows the self-propelled construction machine moving along a path, wherein the reference station is set up at a fourth position.

FIG. 3 shows a simplified schematic diagram of the position determination apparatus II, which comprises a DGPS rover unit 14 and a reference station 15. The DGPS rover unit 14 is provided on the construction machine I, so that the DGPS rover unit 14 moves with the construction machine I in the terrain, while the reference station 15 is set up in the vicinity of the construction machine.

FIGS. 4 to 7 show the movement of the construction machine I, in particular road milling machine, in the terrain along a path 16, in particular a road. In FIGS. 4 to 7, the installation locations where the reference station 15 is set up are marked with a cross. The installation locations, which are specified when planning the construction site, can be markings in the terrain, for example, which can be easily located on site. While the construction machine I moves along the path 16, the reference station 15 is converted several times so that the reference station is always located within a radius 17 of the construction machine I which does not exceed a determined radius. The positions P1(X1, Y1, Z1), P2(X2, Y2, Z2), P3(X3, Y3, Z3), P4(X4, Y4, Z4) of the installation sites are described by coordinate values in a coordinate system independent of the construction machine. These coordinate values can be X, Y, Z coordinate values of a Cartesian coordinate system. For illustration purposes, the X, Y, Z coordinate values for each position P1(X1, Y1, Z1), P2(X2, Y2, Z2), P3(X3, Y3, Z3), P4(X4, Y4, Z4) are each represented in a table. These coordinate values form a position dataset PD that describes the specified positions of a reference station.

The DGPS rover unit 14 comprises a GPS antenna 14A arranged at the reference point R of the construction machine I, a computing and evaluation unit 18 and a bidirectional transmitting and receiving unit 19. The reference station 15 has a GPS antenna 20, a computing and evaluation unit 21 and a bidirectional transmitting and receiving unit 22. DGPS rover unit 14 and reference station 15 communicate by means of transmitting and receiving units 19, 22, which are intended to be representative of the known transmission links that can operate according to the known transmission methods (RF transmitter/receiver, WLAN, Bluetooth, etc.).

The GPS antenna 20 of the reference station 15 receives the satellite signals of several satellites of a satellite navigation system S, wherein its computing and evaluation unit 21 is configured in such a way that the positions P1'(X1', Y1', Z1'), P2'(X2', Y2', Z2'), P3'(X3', Y3', Z3'), P4'(X4', Y4', Z4') of the reference station 15 are determined from the satellite signals with an accuracy corresponding to the GPS system. These positions are referred to as the positions P1', P2', P3', P4' of the reference station 15 determined or measured or received by the reference station. The calculation and evaluation unit 21 of the reference station 15 is further configured in such a way that correction signals are generated according to the known methods on the basis of the actual reference station position P1(X1, Y1, Z1), P2(X2, Y2, Z2), P3(X3, Y3, Z3), P4(X4, Y4, Z4) and the measured reference station position P1'(X1', Y1', Z1'), P2'(X2', Y2', Z2'), P3(X3', Y3', Z3'), P4'(X4', Y4', Z4'), for which, in addition to the measured reference station position, the actual reference station position must also be known.

The DGPS rover unit 14 also receives the satellite signals of a plurality of satellites of a global navigation satellite system S by means of the GPS antenna 14A. Furthermore, the DGPS rover unit 14 receives the correction signals of the reference station 15 by means of the transmitting receiving unit 19. The calculation and evaluation unit 18 of the DGPS rover unit 14 is configured in such a way that, according to the known methods, the (exact) position of the reference point (R) on the construction machine describing position data) in the coordinate system (X, Y, Z) independent of the construction machine is determined with a higher accuracy on the basis of the satellite signals and the correction signals.

The computation and evaluation unit 18 of the DGPS rover unit 14 and the computation and evaluation unit 21 of the reference station 15 may have, for example, a general processor, a digital signal processor (DSP) for continuous processing of digital signals, a microprocessor, an application specific integrated circuit (ASIC), a logic element integrated circuit (FPGA) or other integrated circuits (IC) or hardware components. A data processing program (software) can run on the hardware components. A combination of the various components is also possible.

Various exemplary embodiments of the position determination system II are described below.

FIG. 3 shows an exemplary embodiment in which the calculation and evaluation unit 18 of the DGPS rover unit 14 interacts with an external memory unit 23 in which the position dataset PD describing the predetermined positions of the reference station is stored. This memory unit 23 can also be the data storage of a server unit III (file server), wherein the computing and evaluation unit 18 forms a network with the file server, which can be a WLAN. However, data exchange with the external memory unit can also take place via the Internet.

The calculation and evaluation unit 18 of the DGPS rover unit 14 and the calculation and evaluation unit 21 of the reference station 15 are configured in such a way that the following method steps are performed to initialize the reference station.

The reference station 15 set up at the positions P1(X1, Y1, Z1), P2(X2, Y2, Z2), P3(X3, Y3, Z3), P4(X4, Y4, Z4) receives the satellite signals and transmits the measured position data P1'(X1', Y1', Z1'), P2'(X2', Y2', Z2'), P3(X3', Y3', Z3'), P4(X4', Y4', Z4') to the DGPS rover unit 14 by means of the transmitting and receiving unit 22, which describe the reference station position determined by the reference station (FIG. 3, FIGS. 4 to 7). This position data is received by the DGPS rover unit by means of the transmitting and receiving unit 19. The DGPS rover unit 14 reads the position dataset PD describing the predetermined positions of the reference station from the external memory unit 23. Based on a comparison of the predetermined reference station positions P1(X1, Y1, Z1), P2(X2, Y2, Z2), P3(X3, Y3, Z3), P4(X4, Y4, Z4) with the reference station position P1'(X1', Y1', Z1'), P2'(X2', Y2', Z2'), P3(X3', Y3', Z3'), P4(X4', Y4', Z4') determined by the reference station 15, the DGPS rover unit 14 determines the actual reference station position P1(X1, Y1, Z1), P2(X2, Y2, Z2), P3(X3, Y3, Z3), P4(X4, Y4, Z4) and transmits position data describing the actual reference station position by means of the transmitting and receiving unit 19 to the reference station 15, which receives this position data by means of the transmitting and receiving unit 22. After the reference station 15 knows its actual position, its computing and evaluation unit 22 calculates the correction signals which it sends to the DGPS rover unit 14. The calculation and evaluation unit 18 of the DGPS rover unit 14 then calculates the position data describing the exact position of the reference point R on the construction machine based on the satellite signals and the correction signals.

To select the associated coordinate values, the calculation and evaluation unit 18 of the DGPS rover unit 14 compares the received reference station position P1'(X1', Y1', Z1'), P2'(X2', Y2', Z2'), P3(X3', Y3', Z3'), P4(X4', Y4', Z4') of the reference station 15 with the predetermined reference station positions P1(X1, Y1, Z1), P2(X2, Y2, Z2), P3(X3, Y3, Z3), P4(X4, Y4, Z4) from the position dataset PD, which are assigned to the individual set-up locations. This will be described using the following exemplary embodiment.

FIG. 3 shows the reference station 15 set up at position P1. The measured coordinate values (X1', Y1', Z1') of the reference station position are (3, 5, 0). The calculation and evaluation unit 18 of the DGPS rover unit 14 determines the deviations of the coordinate values (X1=4, Y1=5, Z1=1), (X2=8, Y2=8, Z2=0), (X3=12, Y3=6, Z3=2, (X4=15, Y4=7, Z4=2) of the predetermined positions of the reference station from the reference station position (3, 5, 0) determined by the reference station 15. It can be seen that for the position P1 the deviation of the coordinate values is the smallest. Therefore, the actual position of the reference station is assumed to be the position with the coordinate values (4, 5, 1). For example, a mean deviation can be calculated from the coordinate values as follows.

Position P1

Amount of 3−4=1

Amount of 5−5=0

Amount of 0−1=1

$$\text{Mean deviation:}(1+0+1)/3=2/3\text{[smallest mean deviation)]}$$

Position P2

Amount of 3−8=5

Amount of 5−8=3

Amount of 0−0=0

$$\text{Mean deviation:}(5+3+0)/3=8/3$$

Position P3

Amount of 3−12=9

Amount of 5−6=1

Amount of 0−2=2

$$\text{Mean deviation:}(9+1+2)/3=4$$

Position P4

Amount of 3−15=12

Amount of 5−7=2

Amount of 0−2=2

$$\text{Mean deviation:}(12+2+2)/3=16/3$$

The calculation and evaluation unit 18 of the DGPS rover unit 14 selects the position P1 with the coordinate values (4, 5, 1), since the average deviation ⅔ is smallest for the position P1. However, the distances (path distances) in the plane (two-dimensional) or in the room (three-dimensional)

between the positions in the coordinate system can also be calculated, for example, and the position with the smallest distance can be selected.

The calculation and evaluation unit 18 of the DGPS rover unit 14 may also be configured in such a way that the actual position of the reference station 15 is assumed to be the predetermined position of the reference station whose coordinate values deviate from the coordinate values of the reference station position determined by the reference station by a value that is smaller than or equal to a predetermined limit value, or deviate by values that are smaller than or equal to predetermined limit values. For example, the amount of the difference of the individual coordinate values can be calculated as follows and compared, for example, with the limit value 1:

| | | |
|---|---|---|
| | Position P1 (limit value 1) | |
| | Amount of 3 − 4 = 1 | |
| | Amount of 5 − 5 = 0 | |
| | Amount of 0 − 1 = 1 | |
| 1 ≤ 1 | 0 ≤ 1 | 1 ≤ 1 |
| | Position P2 (limit value 1) | |
| | Amount of 3 − 8 = 5 | |
| | Amount of 5 − 8 = 3 | |
| | Amount of 0 − 0 = 0 | |
| 5 > 1 | 3 > 1 | 0 ≤ 1 |
| | Position P3 (limit value 1) | |
| | Amount of 3 − 12 = 9 | |
| | Amount of 5 − 6 = 1 | |
| | Amount of 0 − 2 = 2 | |
| 9 > 1 | 1 ≤ 1 | 2 > 1 |
| | Position P4 (limit value 1) | |
| | Amount of 3 − 15 = 12 | |
| | Amount of 5 − 7 = 2 | |
| | Amount of 0 − 2 = 2 | |
| 12 > 1 | 2 > 1 | 2 > 1 |

The calculation and evaluation unit 18 of the DGPS rover unit 14 selects the position P1 with the coordinate values (4, 5, 1), since the coordinate values at position 1 are less than or equal to the limit value 1.

Figure 8:
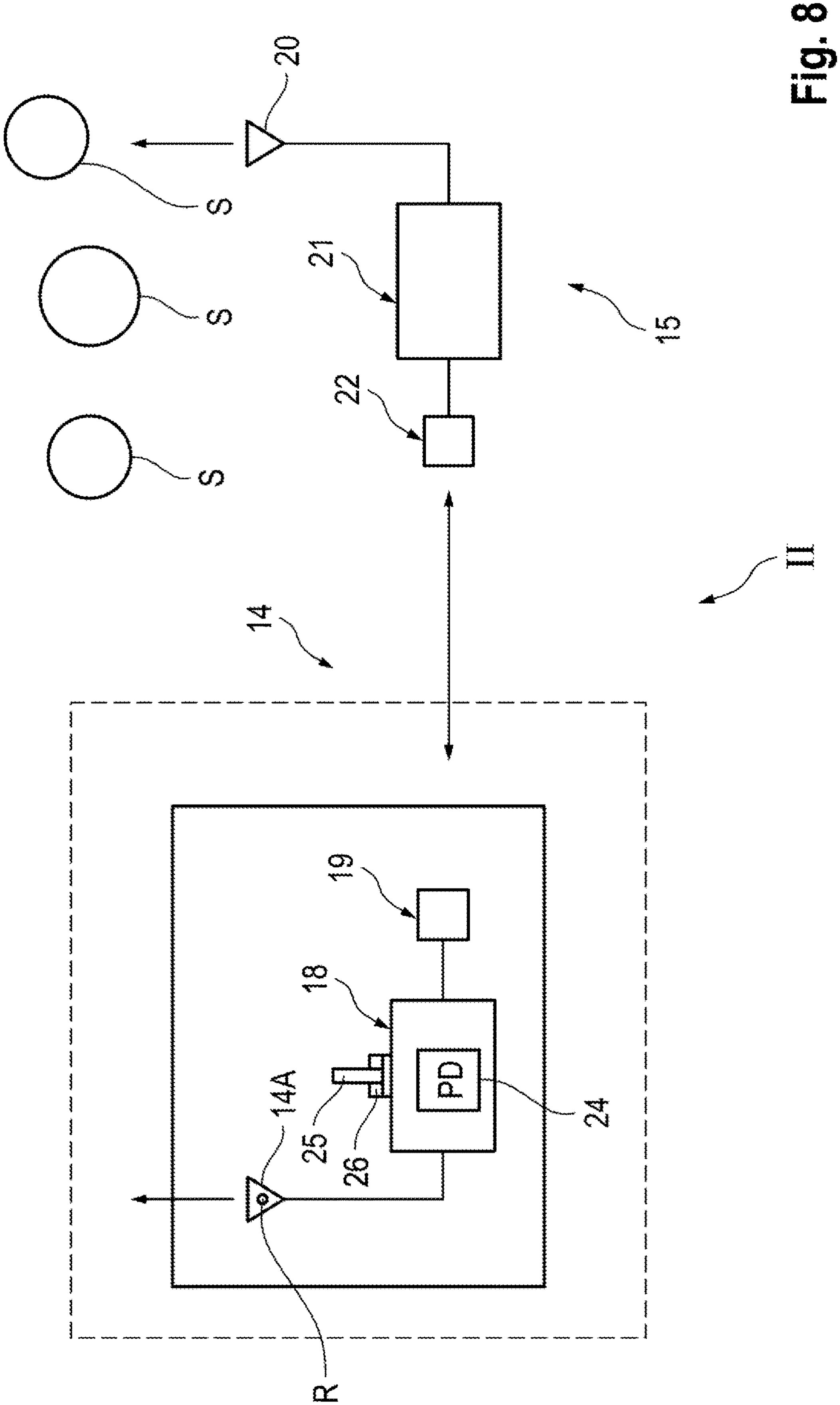
FIG. 8 shows a further exemplary embodiment of the position determination system for determining the position of a reference point on the construction machine.

FIG. 8 shows an exemplary embodiment that differs from the exemplary embodiment described with reference to FIG. 3 in that the computing and evaluation unit 18 of the DGPS rover unit 14 has an internal memory unit 24 on which the position dataset PD is stored. The corresponding components are given the same reference numerals in the figures. The calculation and evaluation unit 18 has a data interface 26 via which the position dataset PD can be read into the internal memory unit 24 from a mobile data carrier, for example from a USB stick 25. To read in the data, the USB stick 25 is inserted into a USB socket 26 provided on the DGPS rover unit 14. Consequently, the position dataset PD is not read from an external memory unit 23, for example a file server (FIG. 3), but from an internal memory unit 24.

The computing and evaluation unit 18 of the DGPS rover unit 14 and the computing and evaluation unit 21 of the reference station 15 can also be configured in such a way that the following method steps are performed to initialize the reference station.

The calculation and evaluation unit 18 of the DGPS rover unit 14 reads the position dataset PD describing the predetermined positions P1(X1, Y1, Z1), P2(X2, Y2, Z2), P3(X3, Y3, Z3), P4(X4, Y4, Z4) of the reference station from the external memory unit 23 (FIG. 3) or the internal memory unit 24 of the DGPS rover unit 14 (FIG. 8) and transmits the position dataset PD to the reference station 15, wherein the reference station receives this position data. In this exemplary embodiment, the reference station 15 then determines the actual reference station position based on a comparison of the predetermined positions of the reference station with the reference station position determined by the reference station, as described with reference to FIG. 3.

Figure 9:
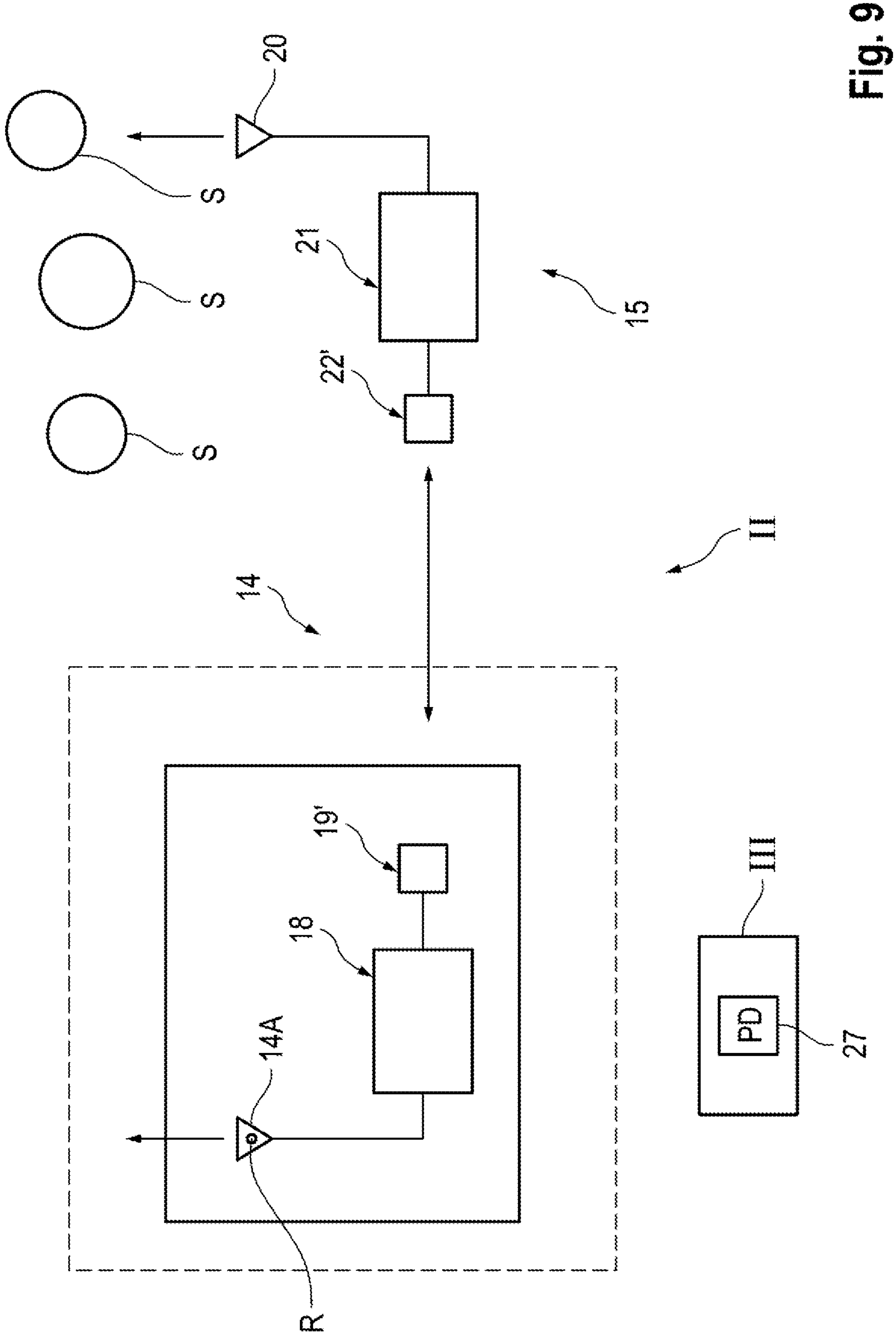
FIG. 9 shows a further exemplary embodiment of the position determination system for determining the position of a reference point on the construction machine.

FIG. 9 shows another exemplary embodiment in which a server unit III has a memory unit 27 on which the position dataset PD is stored. The server unit III forms a network with the reference station 15, for example a WLAN or the reference station 15 communicates with the server unit III via the Internet. The computing and evaluation unit 21 of the reference station 15 and the server unit are configured in such a way that the reference station 15 transmits the reference station position P1'(X1', Y1', Z1'), P2'(X2', Y2', Z2'), P3(X3', Y3', Z3'), P4(X4', Y4', Z4') determined by the reference station 15 to the server unit III, and these position data are received by the server unit III, wherein, in contrast to the embodiment shown in FIG. 3, not the DGPS rover unit 14 but the server unit III determines the actual reference station position on the basis of a comparison of the predetermined positions of the reference station with the reference station position determined by the reference station, and transmits position data P1(X1, Y1, Z1), P2(X2, Y2, Z2), P3(X3, Y3, Z3), P4(X4, Y4, Z4) describing the actual reference station position to the reference station 15, and the reference station receives this position data. In this exemplary embodiment, bidirectional data transmission between DGPS rover unit 14 and reference station 15 is not required. Therefore, the reference station 15 has only one transmitting unit 22' and the DGPS rover unit 14 has only one receiving unit 19'. The reference station 15 is further designed to exchange data with the server unit III.

However, it is also possible for the server unit to send a position dataset PD describing the predetermined positions of the reference station to the reference station 15 and for the reference station 15 to receive this position dataset, wherein the reference station 15 then determines the actual reference station position P(X, Y, Z) based on a comparison of the predetermined positions P1(X1, Y1, Z1), P2(X2, Y2, Z2), P3(X3, Y3, Z3), P4(X4, Y4, Z4) of the reference station with the reference station position P1'(X1', Y1', Z1'), P2'(X2', Y2', Z2'), P3(X3', Y3', Z3'), P4(X4', Y4', Z4') determined by the reference station, as described with reference to FIG. 3 is described.

In principle, the data memory (USB stick 25) can also be connected to the reference station in order to subsequently transmit the position dataset PD to the reference station 15.

In various embodiments, the DGPS rover as noted above determines position data describing the position of a reference point on a self-propelled construction machine in a coordinate system independent of the construction machine, wherein a controller associated with the self-propelled construction machine, for example as part of a positioning system thereof, may generate control signals to respective actuators for automatically controlling, e.g., a position of a working apparatus, and thereby working of terrain by the working apparatus, based at least in part on the determined position data. For construction machines of a type including, for example, road milling machines, stabilizers, recyclers, or the like, the working apparatus may comprise a milling/cutting drum equipped with milling or cutting tools. For construction machines of a type including, for example, slipform pavers, the working apparatus may be a device for shaping flowable material, particularly concrete, which can be used to produce building structures of various designs, for example crash barriers or traffic islands. The controller associated with the self-propelled construction machine may also generate control signals to respective actuators for automatically controlling a drive unit operable to perform movements of the civil engineering machine in translation and/or rotation on the ground.

What is claimed is:

1. A system for determining a position of a reference point on a self-propelled construction machine in a coordinate system independent of the construction machine, the system comprising:

a differential global positioning system (DGPS) rover associated with the construction machine;

a reference station placed in a periphery of the construction machine and configured to determine a reference station position;

at least a first processor associated with the reference station and configured, during an initialization of the reference station, to transmit position data to the DGPS rover describing the reference station position determined by the reference station;

at least a second processor associated with the DGPS rover and configured to:

receive the position data from the reference station;

read out a position dataset describing a plurality of predetermined positions of the reference station from a memory unit;

determine an actual reference station position from among the plurality of predetermined positions based on a comparison of the predetermined positions and the reference station position determined by the reference station; and transmit position data describing the actual reference station position to the reference station;

wherein the reference station is further configured to calculate correction signals based on the actual reference station position and the reference station position determined by the reference station, and to transmit the correction signals to the DGPS rover; and wherein the DGPS rover is configured to receive satellite signals of a global navigation satellite system (GNSS) and the correction signals of a reference station, and to determine position data describing a position of a reference point on the construction machine in a coordinate system independent of the construction machine based on the satellite signals and the correction signals.

2. The position determining system of claim 1, wherein:

deviations of coordinate values for respective predetermined positions of the reference station are determined with respect to the reference station position determined by the reference station; and the actual reference station position is the predetermined position of the reference station whose coordinate values deviate from coordinate values of the reference station position determined by the reference station by a smallest value or deviate by smallest values.

3. The position determination system of claim 1, wherein:

deviations of coordinate values for respective predetermined positions of the reference station are determined with respect to the reference station position determined by the reference station; and the actual reference station position is the predetermined position of the reference station whose coordinate values are derived from coordinate values of the reference station position determined by the reference station by a value smaller than or equal to a predetermined limit value or by values smaller than or equal to predetermined limit values.

4. The position determination system of claim 1, wherein the memory unit is an internal memory unit of the DGPS rover unit on which the position dataset is stored.

5. The position determination system of claim 1, wherein the memory unit is an external memory unit on which the position dataset is stored.

6. A method for determining a position of a reference point on a construction machine in a coordinate system independent of the construction machine, the method comprising:

at a DGPS rover associated with the construction machine, receiving satellite signals of a global navigation satellite system;

during initialization of a reference station located independent of the construction machine, transmitting position data from the reference station to the DGPS rover describing a reference station position measured by the reference station;

determining at the DGPS rover an actual reference station position from a comparison of a plurality of predetermined positions of the reference station stored in a memory unit of the reference station and the reference station position measured by the reference station, wherein the actual reference station position is selected from among the plurality of predetermined positions;

transmitting position data describing the actual reference station position from the DGPS rover to the reference station;

transmitting correction signals from the reference station to the DGPS rover, wherein the correction signals are calculated by the reference station based on the actual reference station position and the reference station position measured by the reference station; and determining at the DGPS rover position data describing the position of the reference point on the construction machine in the coordinate system independent of the construction machine based on the satellite signals of the global navigation satellite system and the correction signals from the reference station.

7. The method of claim 6, comprising determining deviations of coordinate values of the predetermined positions of the reference station from the measured reference station position, wherein the actual reference station position is the predetermined position of the reference station whose coordinate values deviate from coordinate values of the reference station position measured by the reference station by a smallest value or deviate by smallest values.

8. The method of claim 6, comprising determining deviations of coordinate values of the predetermined positions of the reference station from the measured reference station position, wherein the actual reference station position is the predetermined position of the reference station whose coordinate values deviate from coordinate values of the reference station position measured by the reference station by a value smaller than or equal to a predetermined limit value or by values smaller than or equal to predetermined limit values.

9. The method of claim 6, wherein a position of a working apparatus of the construction machine is determined in the coordinate system independent of the construction machine based on a known position of the working apparatus relative to the reference point.

10. A system for determining a position of a reference point on a self-propelled construction machine in a coordinate system independent of the construction machine, the system comprising:

a differential global positioning system (DGPS) rover associated with the construction machine;

a reference station placed in a periphery of the construction machine and configured to determine a reference station position;

at least a first processor associated with the DGPS rover unit and configured, during an initialization of the reference station, to read out a position dataset describing predetermined positions of the reference station from a memory unit, and to transmit the position dataset to the reference station;

at least a second processor associated with the reference station and configured to:

determine an actual reference station position based on a comparison of the predetermined positions of the reference station with the reference station position determined by the reference station;

calculate correction signals based on the actual reference station position and the reference station position determined by the reference station; and transmit the correction signals to the DGPS rover; and wherein the DGPS rover is configured to receive satellite signals of a global navigation satellite system (GNSS) and the correction signals of the reference station, and to determine position data describing a position of a reference point on the construction machine in a coordinate system independent of the construction machine based on the satellite signals and the correction signals.

11. The position determining system of claim 10, wherein:

deviations of coordinate values for respective predetermined positions of the reference station are determined with respect to the reference station position determined by the reference station; and the actual reference station position is the predetermined position of the reference station whose coordinate values deviate from coordinate values of the reference station position determined by the reference station by a smallest value or deviate by smallest values.

12. The position determination system of claim 10, wherein:

deviations of coordinate values for respective predetermined positions of the reference station are determined with respect to the reference station position determined by the reference station; and the actual reference station position is the predetermined position of the reference station whose coordinate values are derived from coordinate values of the reference station position determined by the reference station by a value smaller than or equal to a predetermined limit value or by values smaller than or equal to predetermined limit values.

13. The position determination system of claim 10, wherein the memory unit is an internal memory unit of the DGPS rover unit on which the position dataset is stored.

14. The position determination system of claim 10, wherein the memory unit is an external memory unit on which the position dataset is stored.

* * * * *